H. V. STEUERNAGEL.
CLAMP.
APPLICATION FILED SEPT. 2, 1914.
1,126,116.
Patented Jan. 26, 1915.
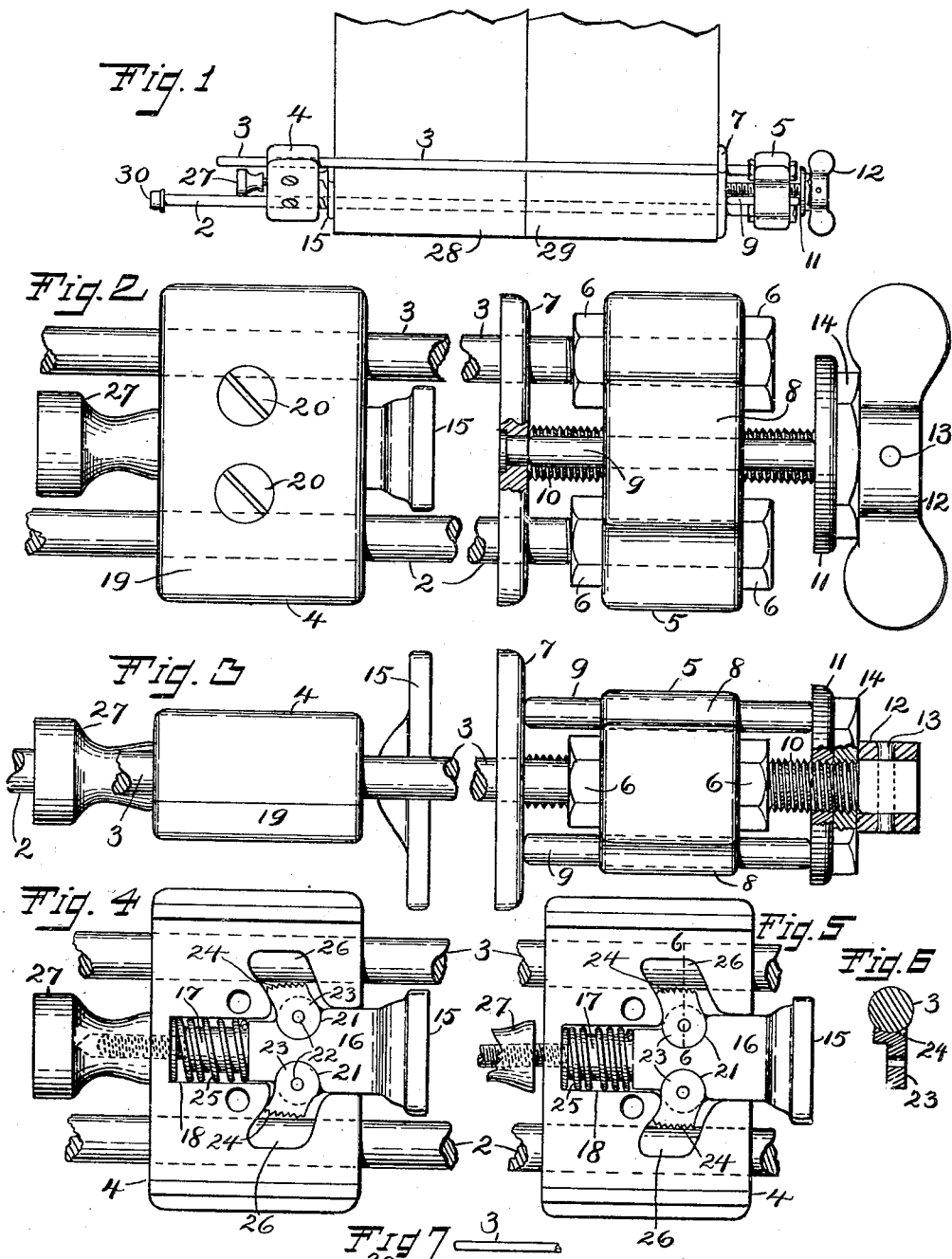

UNITED STATES PATENT OFFICE.

HUGO V. STEUERNAGEL, OF HARTFORD, CONNECTICUT.

CLAMP.

1,126,116.  Specification of Letters Patent.  Patented Jan. 26, 1915.

Application filed September 2, 1914. Serial No. 859,758.

*To all whom it may concern:*

Be it known that I, HUGO V. STEUERNAGEL, a subject of the Emperor of Germany, residing at Hartford, in the county of Hartford and State of Connecticut, have invented certain new and useful Improvements in Clamps, of which the following is a specification.

This invention relates to clamps, the object of the invention being to provide a simple article of this character which is effective in operation, easy to manipulate, and which will solidly and substantially hold two or more pieces of work in proper relation without possibility of the work or the clamp tipping.

The device possesses other features of novelty and advantage which with the foregoing will be stated at length in the following description, wherein I will set forth in detail that one of the several forms of embodiment of the invention which I have selected for illustration in the drawings accompanying and forming part of the present specification. This showing is to enable those skilled in the art to practice the invention. I do not restrict myself thereto; I may depart therefrom in several respects within the scope of the invention defined by the claims following said description.

Referring to said drawings: Figure 1 is a top plan view of the clamp showing the same in action and as holding together two pieces of work. Fig. 2 is a similar view of the same, the parts being broken away and the sections of the article at opposite sides of the break, being brought together. Fig. 3 is a side elevation of the same, parts thereof being in section. Fig. 4 is a detail view of a block with the face plate removed and showing the dogs in their inoperative positions. Fig. 5 is a like view showing the dogs set. Fig. 6 is a cross section on the line 6—6 of Fig. 5. Fig. 7 is a detail view showing the block as disconnected from the guide member.

Like characters refer to like parts throughout the several views, Figs. 2, 3, 4, 5 and 6 thereof being on the same scale which is much larger than that of Figs. 1 and 7.

The different parts of the article are connected with suitable supporting and guiding means and the parallel rods 2 and 3 answer satisfactorily in this connection. These rods may be made of any suitable length. Associated with the rods are blocks as 4 and 5, the blocks being removably connected with the rods, so that rods of a different length can be substituted for those shown. The adjacent end portions of the rods 2 and 3 extend through perforations or holes in the block 5 and are maintained normally in rigid relation with said block 5 in any desirable manner, for instance said rods may be threaded to receive the nuts 6 which engage the inner and outer surfaces of said block 5 to maintain said rods in rigid relation with said block but yet to provide for their removable connection therewith. By dismounting the outer nuts 6 the rods can be slipped from out of their perforations or holes in said block 5. Coöperative with the block 5 is a clamping member as 7. This clamping member as shown, consists of a plate perforated to receive the two supporting and guiding rods 2 and 3, the plate being slidable on said rods and being situated between the blocks 4 and 5 but being normally in proximity to the block 5 which in the present case carries means for advancing or setting said clamping member or plate 7. The means in question may vary, although those shown and now to be described answer satisfactorily. The block 5 is provided on its top and bottom approximately centrally of its length with duplicate lugs or ears 8 through perforations in which the push pins 9 freely and slidably extend, the front ends of these push pins being adapted to engage the clamping member or plate at opposite sides of the screw 10 tapped through the block 5, and the front end of which has a swiveled connection with the clamping member or plate 7. The rear ends of these thrust or push pins 9 are adapted to be operated by an actuator such as 11 which as illustrated consists of a disk threaded onto the screw 10. By reason of the fact that the actuator or disk 11 is threaded onto the screw 10, the former can be adjusted to compensate for wear between the same and the outer ends of the two push pins 9. The screw 10 may as shown be provided with a winged operating head 12, pinned or otherwise suitably secured to the outer end of the screw 10, the pin 13 being shown for such purpose. Between the operating head 12 and the actuator or disk 10 is interposed a check nut 14 and should it be necessary to adjust the actuator 10 to take up wear the nut 14 can be advanced to provide a backing for said actuator. It will be clear that when the screw 10 is turned toward the right, the actuator 11 will be carried therewith and will apply force to the pins 9 so as to squarely advance the clamping member 7. The screw 10 is not primarily intended to advance the clamping member 7, although it will aid in this function. Its primary purpose is to retract said clamping member when the head 12 is turned to the left.

The two rods 2 and 3 extend freely through holes in the block 4. Associated with this block 4 is the clamping member 15, the shank of which has a substantially rectangular portion 16 and a cylindrical portion 17, the body of the block 4 being slotted or channeled as at 18 to receive the said shank, said channel or slot 18 and the parts inclosed by the body of the block being covered by the removable face plate 19 normally held in position by screws as 20 tapped into the body of the block. The rectangular portion 16 has semi-circular notches 21 in which are pivoted as at 22 the tail portions of locking dogs as 23, the operative ends of said dogs having fine teeth 24 to coöperate with the rods 2 and 3 as will hereinafter appear. The walls of the notches 21 and the inner ends of the dogs 23 are on arcs struck from the centers of movement of the respective dogs 23, the inner ends of said dogs having a comparatively close contact with said walls so that the latter take up the thrust of the dogs and relieve the pivots thereof from such thrust. Surrounding the cylindrical portion 17 is the coiled spring 25, one end of which bears against the shoulder formed at the junction of the cylindrical portion 17 and square portion 16, and the other end of which bears against the outer wall of the channel or slot 18, the spring 25 exerting a constant tendency to push the clamping member 15 forward. It should be noted that the body of the block 4 is oppositely recessed as at 26 to receive the two dogs 23 which as will be clear are normally maintained in their inoperative positions by the spring 25. When the dogs are in this particular relation the block 4 can be freely moved along the rods 2 and 3. On outward movement of the clamping member 15, the dogs 23 are moved toward alinement with a toggle-like action, having a bearing at this time against the outer walls of the recesses 26, their teeth 24 biting against the rods 2 and 3 to thus securely lock the block 4 to said rods. The cylindrical portion 17 extends from the block 4 and as shown is provided with a nut 27 which can be operated to draw the clamping member 15 outward and thus through the dogs 23 lock the block 4 to said rods 2 and 3. When the clamping member 15 is released it is returned to its initial position by the spring 25, the dogs 23 being also returned to their inoperative positions to free the block 4.

The clamp can be used in a great many different ways. In Fig. 1 I have shown one of these. In this view there are two boards 28 and 29 which it is assumed are held together for example by glue. In this event the block 4 is shifted along the rods 2 and 3 so as to separate the clamping member 15 from the clamping member 7 a distance a trifle greater than the width of the two boards 28 and 29. The clamp as a whole is then tipped and the two boards entered between the two rods 2 and 3, with one rod below and the other above the boards, the operator in the meantime having pushed back the clamping member so that the boards can be received between said clamping member 15 and the companion clamping member 7. When this is accomplished the clamping member is released and the spring 25 instantly forces the clamping member 15 against the outer edge of the board 28 so that the two boards are then gripped jointly by the two clamping members 7 and 15. It should be noted at this time, that the screw 10 is at the center of the edge of the board 29. When this is accomplished the head 12 is turned to set up the clamping member 15, and the tighter the clamping member 15 is set in the manner already described, the tighter will be the grip of the dogs 23 on the two rods 2 and 3. It will be evident that it will be impossible for the clamp to slip or tip, and that the boards or other work cannot tip. The clamping members are squarely and accurately presented to each other. In case the work or pieces to be clamped are too wide to follow out the procedure outlined, the block 4 can be adjusted outward the requisite distance and the block 4 rigidly connected to the rods 2 and 3 through the agency of the nut 27 in the manner already described. There may be cases where the two rods cannot straddle the work as set forth, and in this event the block 4 can temporarily be disconnected from one of the rods, for instance the rod 3 as shown in Fig. 5 when the work can be entered between the rods through the open end of the rods, and when this is accomplished the block 4 can be connected with the rod 3 and connected rigidly with both rods by the action of the nut 27. The rod 2 is shown provided with an abutment 30 which may as shown consist of a nut which normally prevents accidental separation of the block 4 from the rod 2. By removing the nut 30, the block 4 can be wholly disconnected from both rods. I also wish to make it clear that the rods may be situated either above or below two boards or like pieces of work and that also two sets of boards can be clamped, one set of boards being at one side of the rods and the other set being at the opposite side of the rods.

What I claim is:

1. A clamp comprising supporting and guiding means, a block slidable on the supporting and guiding means, a clamping member movably connected with the block, means operated by the clamping member on the movement thereof for locking the block to the supporting and guiding means, and a second clamping member coöperative with the other clamping member.

2. A clamp comprising supporting and guiding means, a block slidably connected with said supporting and guiding means, a clamping member movably connected with the block, means actuated by said clamping member on the movement thereof for locking the block to the supporting and guiding means, manually operable means for setting the locking means, and a second clamping member associated with the supporting and guiding means and coöperative with the first mentioned clamping member.

3. A clamp comprising supporting and guiding means, a block slidable on the supporting and guiding means, a clamping member having a shank extending into the block, spring means acting against the clamping member and tending constantly to advance the same, locking means for locking the block to the supporting and guiding means, and set by said shank on the retraction of the clamping member, and a second clamping member coöperative with the first mentioned clamping member and associated with said supporting and guiding means.

4. A clamp comprising a pair of parallel rods, a block slidable on said rods, a clamping member, the shank of which extends into said block, said shank being notched on opposite sides, dogs pivoted in the notches, the inner ends of the dogs and the walls of the notches being respectively in contact and concentric with the axes of motion of the respective dogs, a spring acting against the shank to constantly advance the same and thereby the clamping member, the clamping member when retracted acting through said shank to cause the dogs to bite against the rods to lock the block thereto, and a second clamping member coöperative with the first clamping member.

5. A clamp comprising supporting means, a block movably mounted on the supporting means, a clamping member movably connected with the block, means operated by the clamping member on the movement thereof, for locking the block to the supporting means, and a second clamping member on said supporting means, coöperative with said first mentioned clamping member.

6. A clamp comprising supporting means, a block slidable on the supporting means, a clamping member movably connected with the block, means operated by the clamping member on the movement thereof, for locking the block to the supporting means, manually operable means for operating said clamping member to also effect the action of the locking means and the locking of the block to the supporting means, and a second clamping member coöperative with the other clamping member.

7. A clamp comprising a pair of parallel rods, a block slidable on said rods, a clamping member, the shank of which extends into said block, said shank being notched on opposite sides, dogs pivoted in the notches, the inner ends of the dogs and the walls of the notches being respectively in contact and concentric with the axes of motion of the respective dogs, a spring acting against the shank to constantly advance the same and thereby the clamping member, the clamping member when retracted acting through said shank to cause the dogs to bite against the rods to lock the block thereto, the block having recesses to receive said dogs and said dogs on their motion bearing against the walls of the respective recesses, and a second clamping member coöperative with the first clamping member.

8. A clamping member comprising supporting means having a pair of parallel rods, a block rigidly connected with said rods, a clamping member connected with said block, a second block slidable on the rods, a clamping member movably connected with the second block, and means actuated by the second clamping member on the movement thereof, for locking said second block to said supporting means.

9. A clamp comprising a pair of rods, a block rigidly connected with said rods, a clamping member adjustably connected with said block, a second block slidable on said rods, a clamping member between the rods movably connected with said second block, and means actuated by said second clamping member on the movement thereof for locking the second block to the rods.

10. As an article of manufacture, a block, a clamping member movably connected with said block, and locking means for fastening the block to a support, actuated by said clamping member on the movement thereof.

In testimony whereof I affix my signature in presence of two witnesses.

HUGO V. STEUERNAGEL.

Witnesses:
HEATH SUTHERLAND,
SHEFFIELD H. CLARKE.

Copies of this patent may be obtained for five cents each, by addressing the "Commissioner of Patents, Washington, D. C."